(12) United States Patent
Ma et al.

(10) Patent No.: US 11,996,570 B2
(45) Date of Patent: May 28, 2024

(54) BATTERY CASING ASSEMBLY AND BATTERY HAVING THE SAME

(71) Applicant: Ningde Amperex Technology Ltd., Ningde (CN)

(72) Inventors: Wu Ma, Ningde (CN); GuoWen Zhang, Ningde (CN); Peipei Guo, Ningde (CN); Liqing Lin, Ningde (CN)

(73) Assignee: NINGDE AMPEREX TECHNOLOGY LTD, Ningde (CN)

( * ) Notice: Subject to any disclaimer, the term of this patent is extended or adjusted under 35 U.S.C. 154(b) by 448 days.

(21) Appl. No.: 16/637,834

(22) PCT Filed: Jan. 9, 2020

(86) PCT No.: PCT/CN2020/071208
§ 371 (c)(1),
(2) Date: Feb. 10, 2020

(87) PCT Pub. No.: WO2021/068436
PCT Pub. Date: Apr. 15, 2021

(65) Prior Publication Data
US 2021/0408627 A1    Dec. 30, 2021

(30) Foreign Application Priority Data

Oct. 10, 2019 (CN) .......................... 201910960386.3

(51) Int. Cl.
*H01M 50/181* (2021.01)
*H01M 50/109* (2021.01)
(Continued)

(52) U.S. Cl.
CPC ....... *H01M 50/181* (2021.01); *H01M 50/109* (2021.01); *H01M 50/547* (2021.01);
(Continued)

(58) Field of Classification Search
None
See application file for complete search history.

(56) References Cited

U.S. PATENT DOCUMENTS

2006/0269838 A1*  11/2006  Song ................... H01M 50/147
                                                         29/623.2
2013/0136976 A1*   5/2013  Masuda .............. H01M 50/528
                                                         29/623.2
(Continued)

FOREIGN PATENT DOCUMENTS

CN    102255066 A    11/2011
CN    102544424 A     7/2012
(Continued)

OTHER PUBLICATIONS

English Language Machine Translation of JP2016139586A retrieved from Espacenet (Year: 2016).*
(Continued)

*Primary Examiner* — Matthew J Merkling
(74) *Attorney, Agent, or Firm* — Ladas & Parry LLP (57) ABSTRACT

A battery includes a casing assembly which includes a terminal post and a first casing. The first casing includes a first casing portion and a second casing portion connected to the first casing portion. The first casing portion protrudes from the second casing portion to define a receiving space. The terminal post is fixed to the first casing portion and partially received in the receiving space. A battery including the battery casing assembly is further provided.

9 Claims, 10 Drawing Sheets

(51) Int. Cl.
  *H01M 50/547* (2021.01)
  *H01M 50/559* (2021.01)
  *H01M 50/588* (2021.01)
  *H01M 50/593* (2021.01)

(52) U.S. Cl.
  CPC ....... *H01M 50/559* (2021.01); *H01M 50/588* (2021.01); *H01M 50/593* (2021.01); *H01M 2220/30* (2013.01)

(56) References Cited

U.S. PATENT DOCUMENTS

| | | | | |
|---|---|---|---|---|
| 2018/0138465 | A1* | 5/2018 | Yang | H01M 50/176 |
| 2020/0075905 | A1* | 3/2020 | Hinterberger | H01M 50/258 |
| 2022/0140453 | A1* | 5/2022 | Yamada | H01M 50/446 429/163 |
| 2022/0181725 | A1* | 6/2022 | Katsumoto | H01M 50/172 |
| 2022/0200110 | A1* | 6/2022 | Katsumoto | H01M 50/172 |
| 2022/0384919 | A1* | 12/2022 | Katsumoto | H01M 50/153 |

FOREIGN PATENT DOCUMENTS

| | | |
|---|---|---|
| CN | 103996803 A | 8/2014 |
| CN | 103996806 A | 8/2014 |
| CN | 204946950 U | 1/2016 |
| CN | 204946952 U | 1/2016 |
| CN | 106159350 A | 11/2016 |
| CN | 106450063 A | 2/2017 |
| CN | 206250229 U | 6/2017 |
| CN | 206727177 U | 12/2017 |
| CN | 207398195 U | 5/2018 |
| CN | 207818646 U | 9/2018 |
| CN | 207818742 U | 9/2018 |
| CN | 208 225 925 U | 12/2018 |
| CN | 208225925 U | 12/2018 |
| CN | 208256740 U | 12/2018 |
| CN | 208256767 U | 12/2018 |
| CN | 208460813 U | 2/2019 |
| CN | 109671878 A | 4/2019 |
| CN | 209087917 U | 7/2019 |
| CN | 110176558 A | 8/2019 |
| EP | 2 899 779 | 5/2018 |
| EP | 3 321 998 A1 | 5/2018 |
| JP | 5341587 B2 | 11/2013 |
| JP | 2014003019 A | 1/2014 |
| JP | 2016122604 A | 7/2016 |
| JP | 2016139586 A * | 8/2016 |
| JP | 2019140100 A | 8/2019 |
| JP | 2017135084 A | 10/2019 |
| KR | 10-2013-0060146 A | 6/2013 |
| KR | 10-2015-0058042 A | 5/2015 |
| WO | 2019167357 A1 | 9/2019 |

OTHER PUBLICATIONS

Chinese Office Action corresponding to counterpart application 201910960386.3 dated Aug. 20, 2021.
Chinese Office Action corresponding to counterpart application 201910960386.3 dated Nov. 15, 2021.
Korean Office Action dated Oct. 10, 2019.
European Search Report corresponding to counterpart application 20709462.4-1108 / 3826082 PCT/CN2020/071208 dated May 27, 2021.
International Search Report for Application No. PCT/CN2020/071208, dated Oct. 10, 2019, 5 pages.
China Office Action for Application No. 201910960386.3, dated Aug. 6, 2020, 9 pages.
China Office Action for Application No. 201910960386.3, dated Oct. 20, 2020, 5 pages.
China Office Action for Application No. 201910960386.3, dated Jan. 25, 2021, 9 pages.
China Rejection Decision for Application No. 201910960386.3, dated Apr. 14, 2021, 6 pages.
Japan Office Action for Application No. 2020-502196, dated Feb. 1, 2022, 3 pages.
Korea Rejection Decision for Application No. 2020-7001680, dated Mar. 15, 2022, 4 pages.
Written Decision on Registration of Korean Patent Application No. 10-2020-7001680, dated Apr. 27, 2022.

* cited by examiner

BATTERY CASING ASSEMBLY AND BATTERY HAVING THE SAME

FIELD

The disclosure relates to batteries, and more particularly, to a battery casing assembly and a battery having the battery casing assembly.

BACKGROUND

Batteries are widely used in portable electronic devices due to the portability of the batteries. The battery includes a casing, a top cover, and a battery cell. The battery cell is received in the casing. The top cover is fixed in a top opening of the casing. A terminal post is fixed in the top cover, and is electrically connected to the battery cell to supply electric power to outside components. However, the terminal post occupies a portion of the casing, resulting in a loss of energy density. Furthermore, the terminal post may pierce the electrode plates of the battery cell during a crush test. Thus, a short circuit may occur, which decreases the safety of the battery.

SUMMARY

What is needed, is a battery casing assembly which can improve the energy density and the safety of the battery, and a battery having the battery casing assembly.

The present disclosure provides a battery casing assembly including a terminal post and a first casing. The first casing includes a first casing portion and a second casing portion connected to the first casing portion. The first casing portion protrudes from the second casing portion to define a receiving space. The terminal post is fixed to the first casing portion and partially received in the receiving space.

In at least one embodiment, the terminal post does not protrude out of the second casing portion along a direction from the first casing portion to the second casing portion.

In at least one embodiment, the first casing portion defines an opening connected to the receiving space. The terminal post includes a post body fixed in the opening.

In at least one embodiment, the terminal post further includes a first terminal plate and a second terminal plate which are connected to end portions of the post body. The first terminal plate is received in the receiving space, the second terminal plate is positioned outside the receiving space. A width of the post body is less than a width of the first terminal plate and a width of the second terminal plate, thereby forming a receiving slot at periphery of the terminal post. The first casing portion is fixed in the receiving slot.

In at least one embodiment, the first casing portion includes a sidewall and a top wall. The opening is defined in the top wall. The sidewall is positioned between the second casing portion and the top wall, and connected to the second casing portion. The top wall is parallel to the second casing portion, and is fixed in the receiving slot.

In at least one embodiment, the battery casing assembly further includes a first insulation plate fixed in the receiving slot. The first insulation plate includes a first insulation portion and a second insulation portion connected to the first insulation portion. The first insulation portion is positioned between the post body and the top wall. The second insulation portion is positioned between the first terminal plate and the top wall.

In at least one embodiment, the battery casing assembly further includes a second insulation plate fixed in the receiving slot. The second insulation plate is positioned between the second terminal plate and the top wall.

In at least one embodiment, a diameter of the first casing portion is not more than 1000 millimeters. A height of the first casing portion, which protrudes from the second casing portion, is not more than 100 millimeters.

In at least one embodiment, the second casing portion surrounds periphery of the first casing portion.

In at least one embodiment, the battery casing assembly further includes a second casing. The first casing is connected to the second casing through the second casing portion.

The present disclosure further provides a battery including a battery cell and the above battery casing assembly.

In at least one embodiment, battery further includes at least one first protection member received in the battery casing assembly. Each of the at least one first protection member is positioned at an end portion of the battery cell.

In at least one embodiment, the battery further includes a second protection member received in the battery casing assembly. The second protection member surrounds periphery of the battery cell.

In at least one embodiment, the first casing and the second casing are connected by soldering. The battery cell includes a positive electrode plate, a negative electrode plate, and an isolation film positioned between the positive electrode plate and the negative electrode plate. The positive electrode plate is electrically connected to the terminal post. The negative electrode plate is electrically connected to the first casing or the second casing.

Since the first casing portion of the first casing protrudes from the second casing portion and the terminal post is partially received in the receiving space, there is no waste of the internal space in the second casing portion because of the terminal post. Then, the energy density of the battery is improved. In addition, since the electrode device may have an irregular internal space, the battery with the said battery cell assembly can be adapted to the internal space of the electrode device. Furthermore, a distance between the terminal post and the battery cell received in the battery cell assembly is increased, which makes the terminal post less likely to pierce the electrode plates of the battery cell during the crush test. Thus, a short circuit can be avoided.

BRIEF DESCRIPTION OF THE DRAWINGS

Implementations of the present disclosure will now be described, by way of embodiments, with reference to the attached figures.

Description of symbols for main elements: 1 represents a battery, 10 represents a terminal post, 11 represents a post body, 12 represents a first terminal plate, 13 represents a second terminal plate, 14 represents a receiving slot, 20 represents a first casing, 21 represents a first casing portion, 22 represents a second casing portion, 30 represents a first insulation plate, 31 represents a first insulation plate, 32 represents a second insulation plate, 40 represents a second insulation plate, 50 represents a second casing, 60 represents a filling plug, 100 represents a battery casing assembly, 200 represents a battery cell, 201 represents a negative electrode plate, 202 represents a positive electrode plate, 203 represents an isolation film, 210 represents a receiving space, 211 represents an opening, 300 represents a first protection member, 400 represents a second protection member, 2010 represents a negative electrode tab, 2020 represents a positive electrode tab, 2101 represents a sidewall, 2102 represents a top wall, D represents a diameter, H represents a height, and T represents a thickness.

Implementations of the disclosure will now be described, with reference to the drawings.

DETAILED DESCRIPTION

Implementations of the disclosure will now be described, by way of embodiments only, with reference to the drawings. The disclosure is illustrative only, and changes may be made in the detail within the principles of the present disclosure. It will, therefore, be appreciated that the embodiments may be modified within the scope of the claims.

Unless otherwise defined, all technical terms used herein have the same meaning as commonly understood by one of ordinary skill in the art. The technical terms used herein are not to be considered as limiting the scope of the embodiments.

Implementations of the disclosure will now be described, by way of embodiments only, with reference to the drawings. It should be noted that non-conflicting details and features in the embodiments of the present disclosure may be combined with each other.

Figure 1:
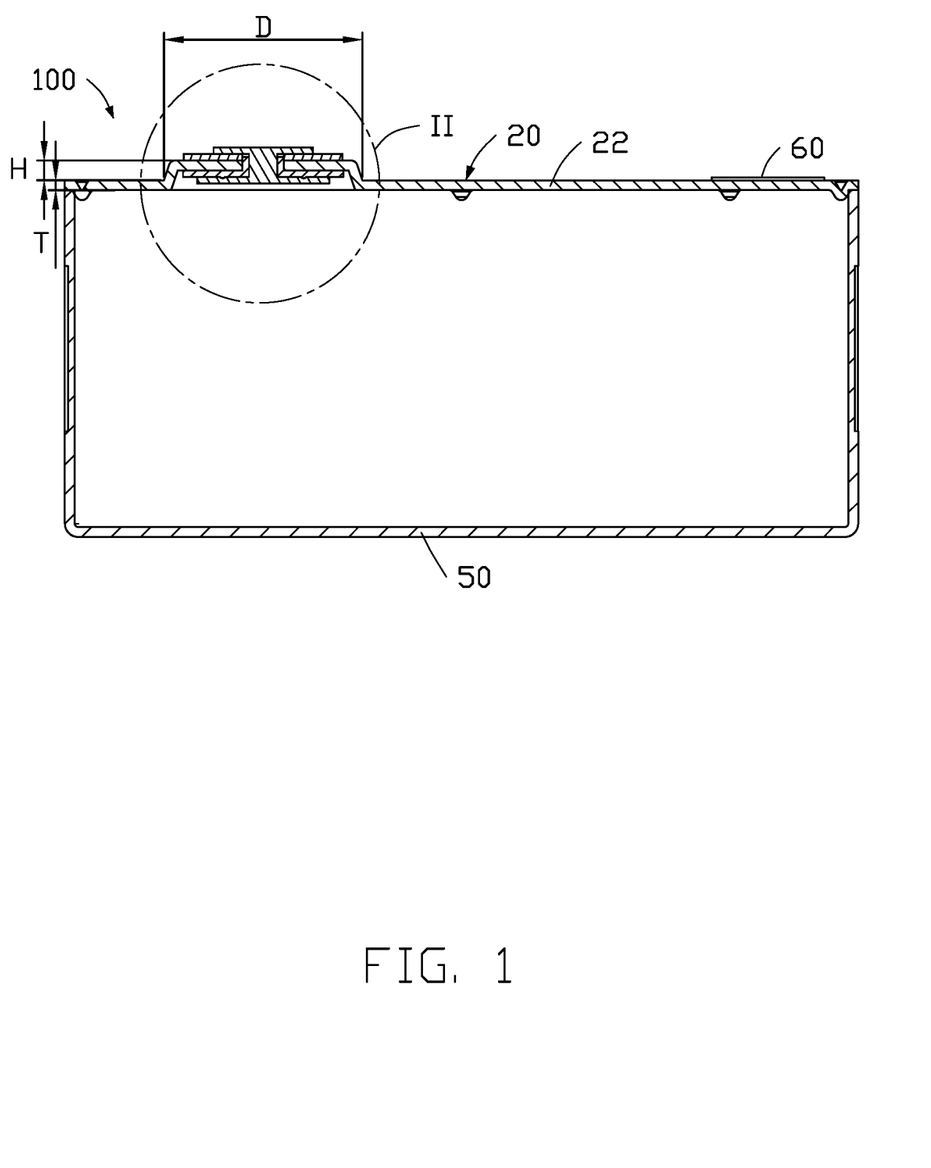
FIG. 1 is a front view of an embodiment of a battery casing assembly according to the present disclosure.
Figure 2:
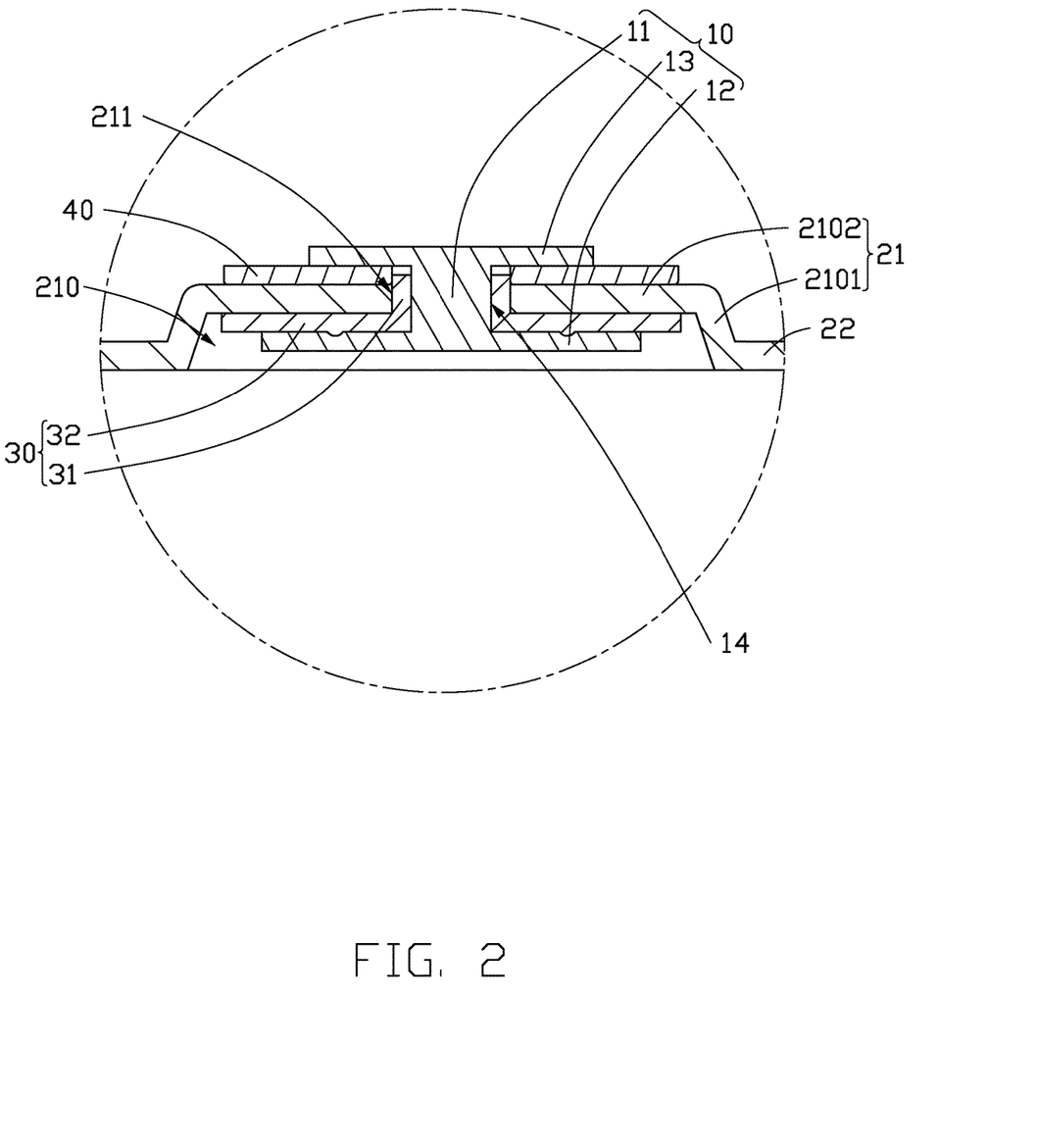
FIG. 2 is an enlarged view of the circle II of FIG. 1.

FIG. 1 and FIG. 2 illustrate an embodiment of a battery casing assembly 100 including a terminal post 10 and a first casing 20. The first casing 20 includes a first casing portion 21 and a second casing portion 22 connected to the first casing portion 21. The first casing portion 21 protrudes from the second casing portion 22 to define a receiving space 210. The terminal post 10 is fixed to the first casing portion 21, and is partially received in the receiving space 210.

Since the first casing portion 21 of the first casing 20 protrudes from the second casing portion 22 and the terminal post 10 is partially received in the receiving space 210, there is no waste of the internal space in the second casing portion 22 because of the terminal post 10. Then, the energy density of the battery is improved. In addition, since an electrode device may have an irregular internal space, a battery with the said battery cell assembly 100 can be more readily adapted to the internal space of the electrode device. Moreover, a distance between the terminal post 10 and the battery cell received in the battery casing assembly 100 is increased, which makes the terminal post 10 less likely to pierce the electrode plates of the battery cell during the crush test. Thus, a short circuit is avoided.

In at least one embodiment, the terminal post 10 does not protrude from the second casing portion 22 along a direction from the first casing portion 21 to the second casing portion 22. That is, a bottom portion of the terminal post 10 can be above or can be at the same level with the plane defined by the second casing portion 22, thereby preventing the terminal post 10 from piercing the electrode plates of the battery cell during the crush test. In at least one embodiment, a diameter D of the first casing portion 21 is not more than 1000 millimeters. A height H of the first casing portion 21, which protrudes from the second casing portion 22, is not more than 100 millimeters.

During manufacturing, the first casing portion 21 can be manufactured by punching. The second casing portion 22 surrounds periphery of the first casing portion 21. In other embodiments, the second casing portion 22 can also be arranged so as not to surround the periphery of the first casing portion 21.

In at least one embodiment, the first casing portion 21 defines an opening 211 connected to the receiving space 210. The terminal post 10 includes a post body 11 fixed in the opening 211. A diameter of the opening 211 can be less than 1000 millimeters. A depth of the opening 211 can be less than 100 millimeters.

Referring to FIG. 2, the terminal post 10 further includes a first terminal plate 12 and a second terminal plate 13, which are connected to opposite end portion of the post body 11. The first terminal plate 12 is received in the receiving space 210. The second terminal plate 13 is positioned outside the receiving space 210. A width of the post body 11 is less than a width of the first terminal plate 12 and a width of the second terminal plate 13, thereby, a receiving slot 14 is formed at periphery of the terminal post 10. The first casing portion 21 is fixed in the receiving slot 14. The first terminal plate 12 does not protrude out of the second casing portion 22 along a direction from the first casing portion 21 to the second casing portion 22. In at least one embodiment, the terminal post 10 can be made of metal or alloy. For example, the terminal post 10 can be made of steel alloy, aluminum alloy, iron alloy, or copper alloy. The post body 11, the first terminal plate 12, and the second terminal plate 13 can be integrally formed, and can also be made separately from each other.

Figure 3:
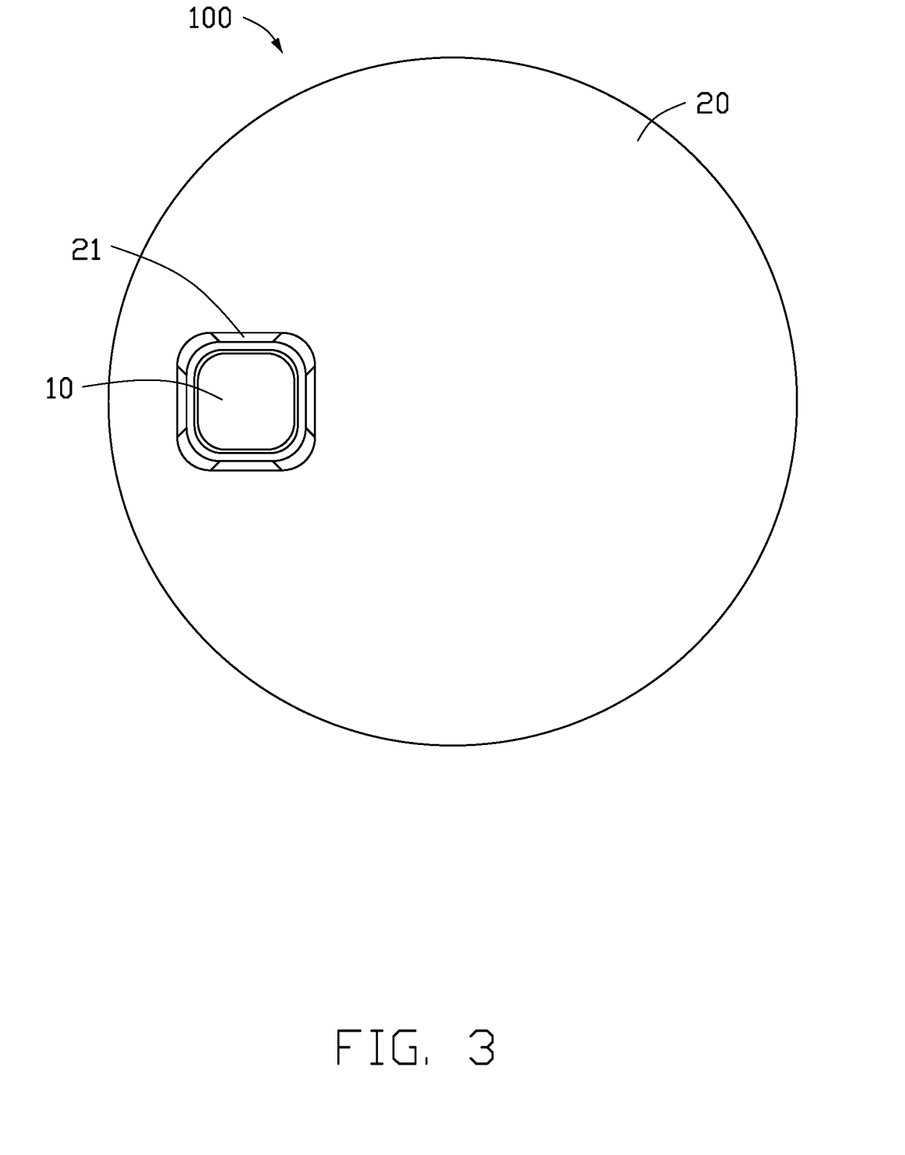
FIG. 3 is a vertical view of the battery casing assembly of FIG. 1 in one embodiment.
Figure 4:
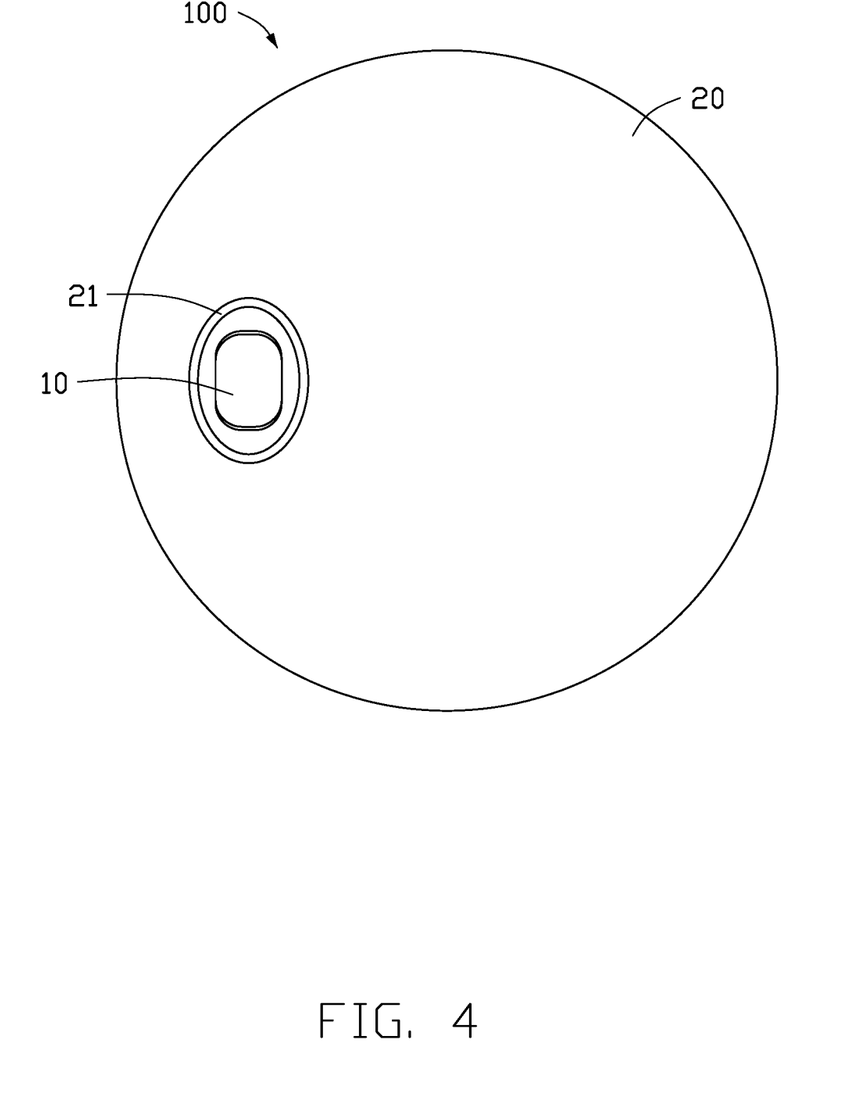
FIG. 4 is a vertical view of the battery casing assembly of FIG. 1 in another embodiment.
Figure 5:
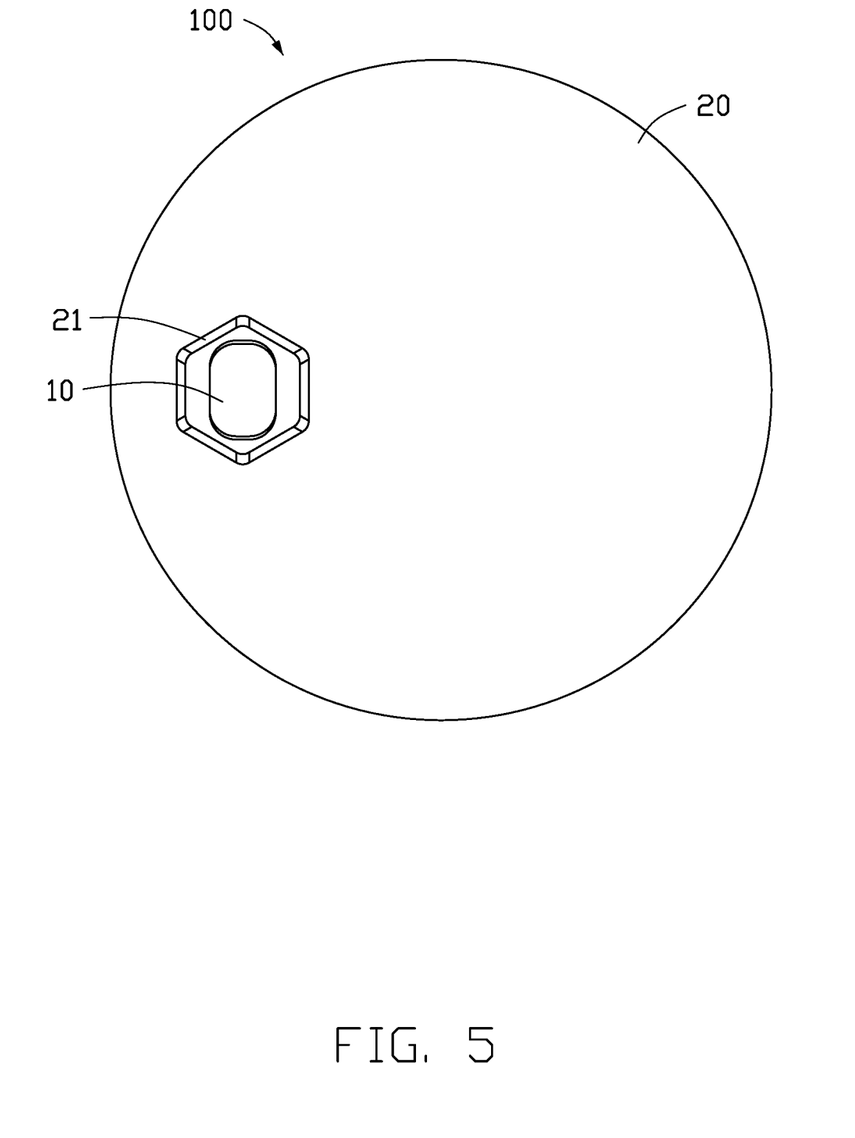
FIG. 5 is a vertical view of the battery casing assembly of FIG. 1 in yet another embodiment.
Figure 6:
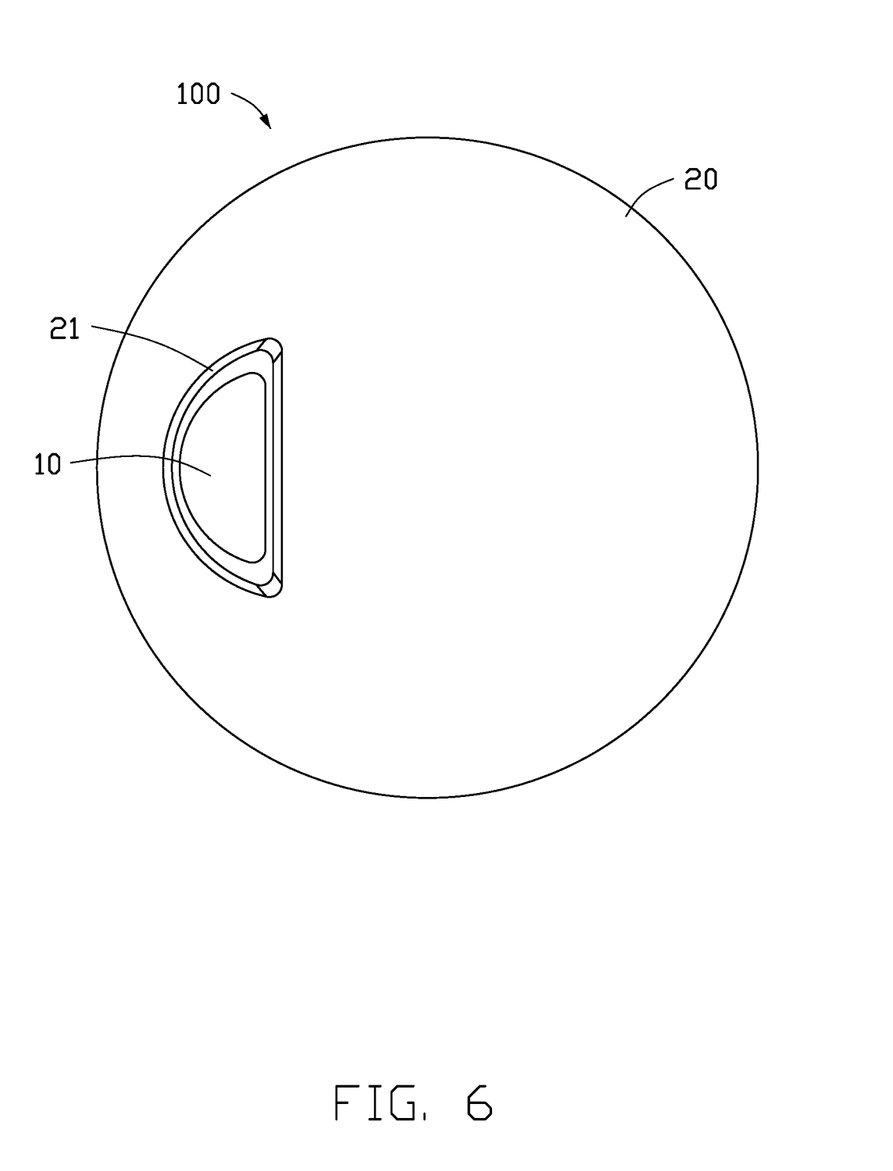
FIG. 6 is a vertical view of the battery casing assembly of FIG. 1 in yet another embodiment.
Figure 7:
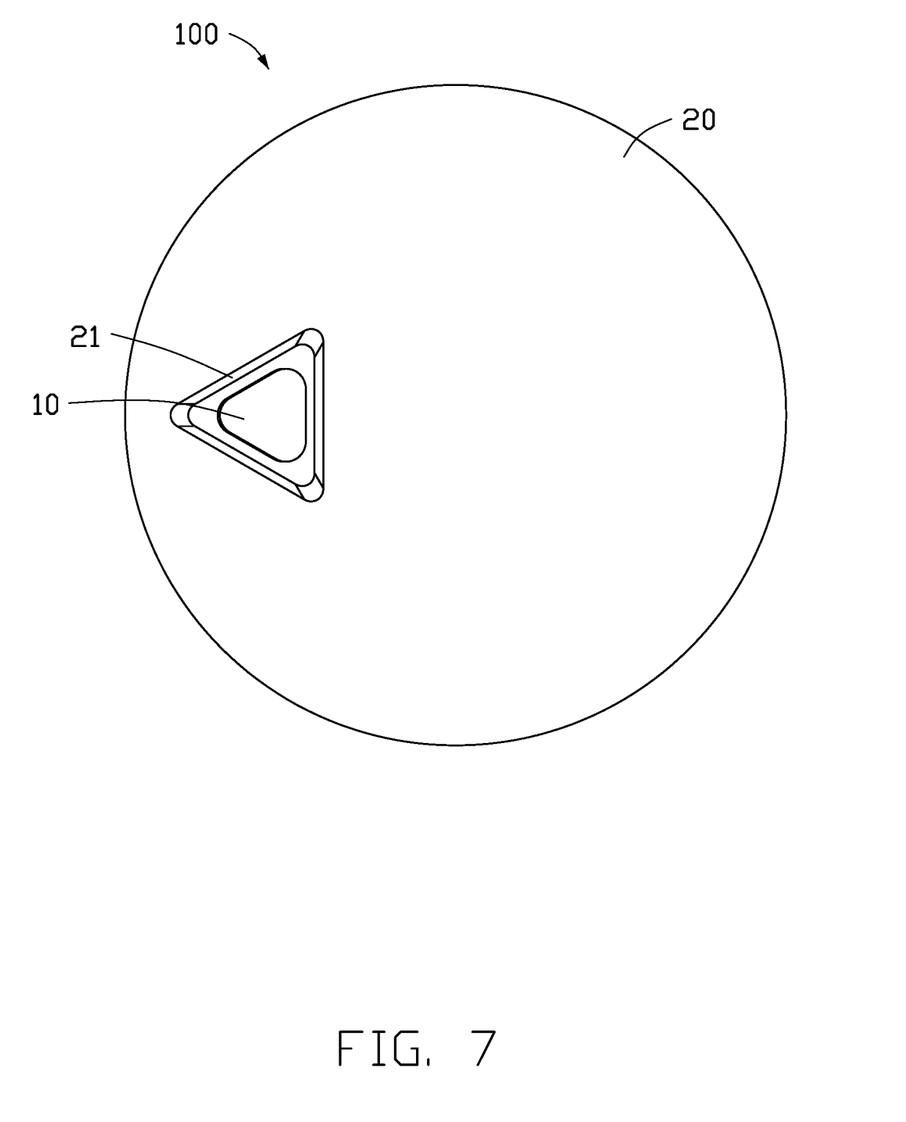
FIG. 7 is a vertical view of the battery casing assembly of FIG. 1 in yet another embodiment.

Furthermore, the first casing portion 21 includes a sidewall 2101 and a top wall 2102. The opening 211 is defined in the top wall 2102. The sidewall 2101 is positioned between the second casing portion 22 and the top wall 2102, and is connected to the second casing portion 22. The top wall 2102 is parallel to the second casing portion 22, and is fixed in the receiving slot 14. In at least one embodiment, the sidewall 2101 is inclinedly connected to the second casing portion 22. An angle of inclination of the sidewall 2101 with respect to the second casing portion 22 is less than 180 degrees. Referring to FIG. 3, the first casing portion 21 is substantially a frustum of a pyramid, which has a square cross section. In other embodiments, the structure of the first casing portion 21 can also be varied according to need. For example, referring to FIG. 4, the first casing portion 21 can also be substantially a frustum of a cone, which has an oval cross section. Referring to FIG. 5, the first casing portion 21 is substantially a frustum of a pyramid, which has a polygonal cross section, such as hexagonal. Referring to FIG. 6, the first casing portion 21 can also be substantially a frustum of a semi-cone, which has a semi-circular cross section. Referring to FIG. 7, the first casing portion 21 is substantially a frustum of a pyramid, which has a triangular cross section.

In at least one embodiment, the battery casing assembly 100 further includes a first insulation plate 30 fixed in the receiving slot 14. The first insulation plate 30 includes a first insulation portion 31 and a second insulation portion 32 connected to the first insulation portion 31. The first insulation portion 31 is positioned between the post body 11 and the top wall 2102. The second insulation portion 32 is positioned between the first terminal plate 12 and the top wall 2102. Moreover, the battery casing assembly 100 further includes a second insulation plate 40 fixed in the receiving slot 14. The second insulation plate 40 is positioned between the second terminal plate 13 and the top wall 2102. The first insulation plate 30 and the second insulation plate 40 electrically isolate the first casing 20 from the terminal post 10, and also seal the gap between the first casing 20 and the terminal post 10. The first insulation plate 30 and the second insulation plate 40 can be made of a plastic such as polyamide.

The first insulation plate 30, the second insulation plate 40, and the top wall 2102 are fixed in the receiving slot 14 through an interference fit. In other embodiments, the first insulation plate 30, the second insulation plate 40, and the top wall 2102 can also be fixed in the receiving slot 14 through other ways such as being riveted.

Figure 8:
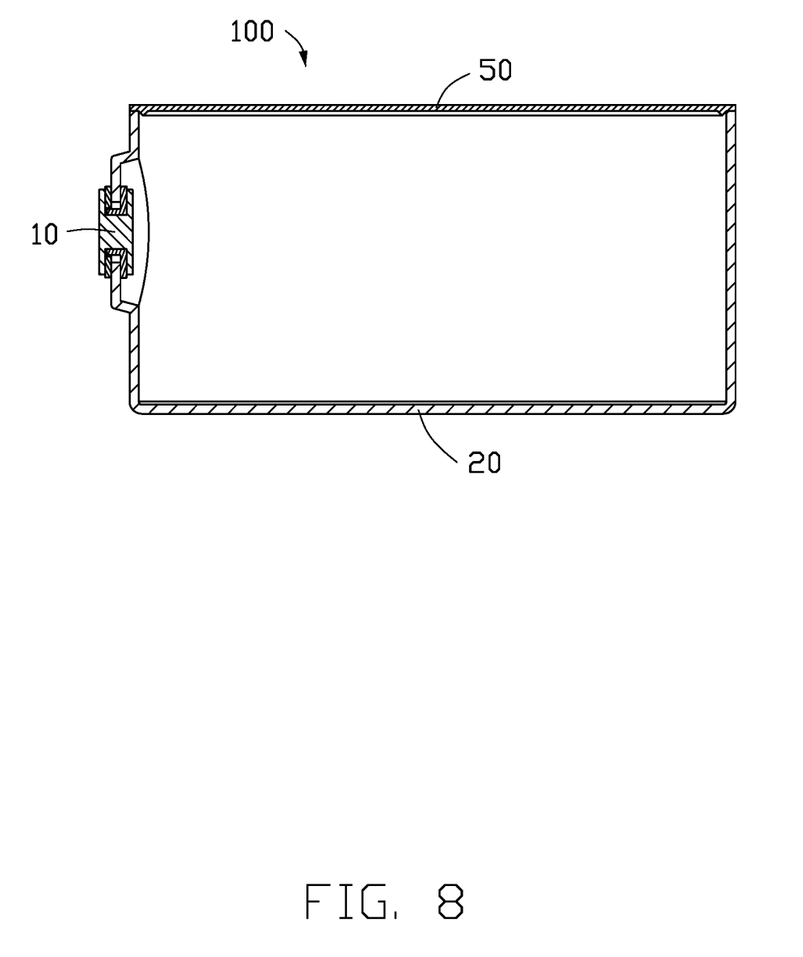
FIG. 8 is a front view of another embodiment of a battery casing assembly according to the present disclosure.
Figure 9:
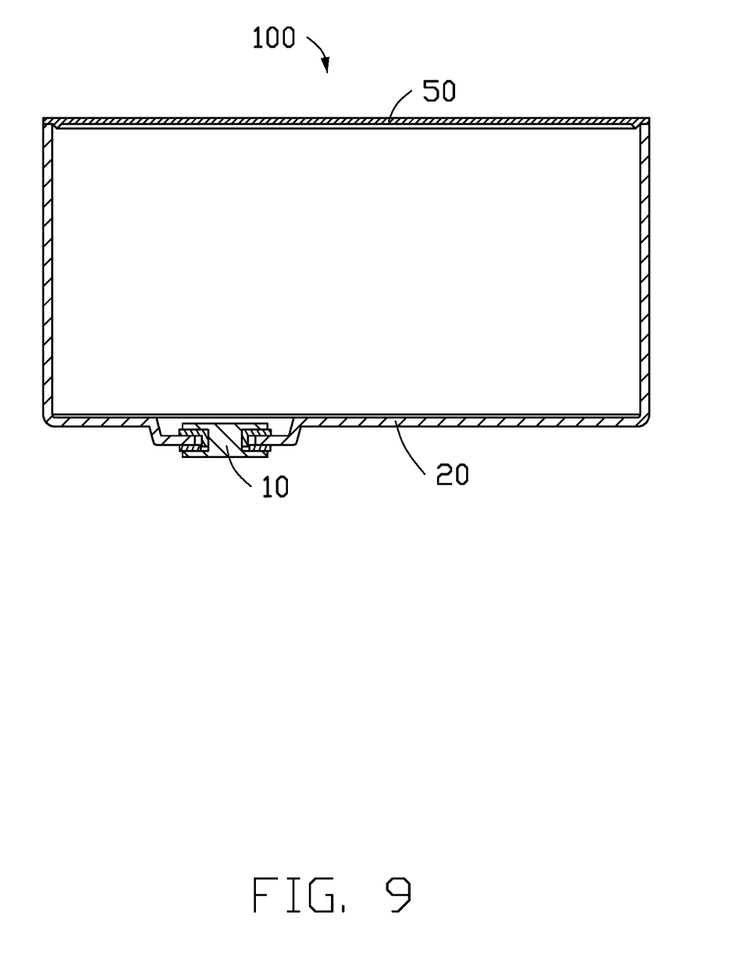
FIG. 9 is a front view of yet another embodiment of a battery casing assembly according to the present disclosure.

Referring to FIG. 1, the first casing 20 is an upper cover of the battery casing. That is, the terminal post 10 is connected to the upper cover. Referring to FIGS. 8 and 9, the first casing 20 can also be a lower shell of the battery casing. The terminal post 10 can be connected to any location of the sidewall or the bottom wall of the lower shell. A thickness T of the first casing 20 is not more than 1000 millimeters.

The battery casing assembly 100 can further include a second casing 50. The first casing 20 is fixed to the second casing 50 through the second casing portion 22, thereby causing the first casing 20 and the second casing 50 to cooperatively define a closed receiving space for receiving the battery cell 200 (shown in FIG. 10). In at least one embodiment, the first casing 20 and the second casing 50 are made of a metal such as stainless steel. The first casing 20 and the second casing 50 are connected by soldering. In another embodiment, the first casing 20 can be made of a plastic such as polyamide. The second casing 50 is made of a metal such as stainless steel. The first casing 20 and the second casing 50 are connected by being snapped together.

Referring to FIG. 1, in at least one embodiment, the battery cell assembly 100 can further include a liquid injection hole (not shown). The liquid injection hole can be defined in the first casing 20 or the second casing 50. Electrolyte can be injected into the battery casing assembly 100 through the liquid injection hole. A filling plug 60 is inserted into the liquid injection hole. The filling plug 60 seals the liquid injection hole, and avoids leakage of the electrolyte and prevents external impurities from entering the battery casing assembly 100.

Figure 10:
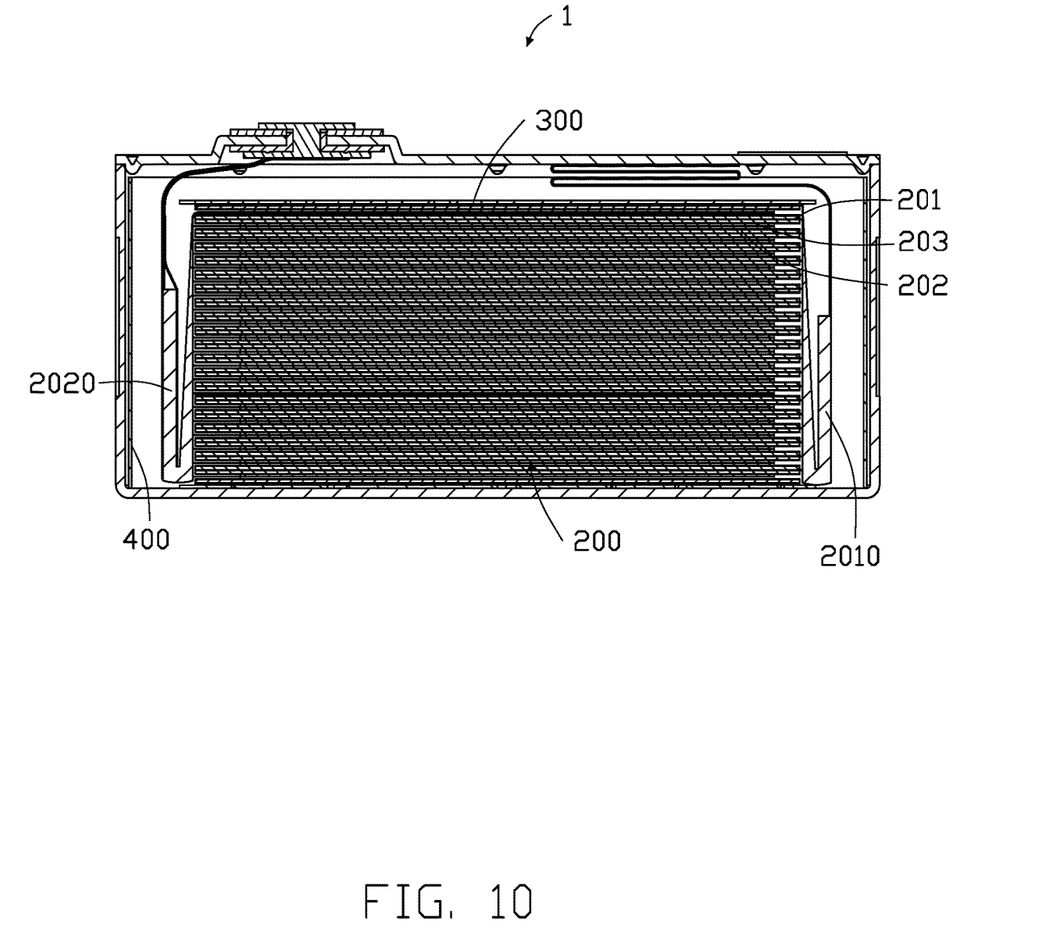
FIG. 10 is a front view of an embodiment of a battery according to the present disclosure.

Referring to FIG. 10, the present disclosure further provides an embodiment of a battery 1. The battery 1 includes a battery cell 200 and the battery casing assembly 100. The battery cell 200 is received in the battery casing assembly 100. The battery 1 can be a button battery. That is, the battery casing assembly 100 of the battery 1 is made of steel.

In at least one embodiment, the first casing 20 and the second casing 50 are connected by soldering. The battery cell 200 includes a negative electrode plate 201, a positive electrode plate 202, and an isolation film 203 positioned between the negative electrode plate 201 and the positive electrode plate 202. The battery cell 200 can be formed by stacking the negative electrode plate 201, the positive electrode plate 202, and the isolation film 203. The negative electrode plate 201 includes a negative current collector and negative active material layers formed on the negative current collector. The positive electrode plate 202 includes a positive current collector and positive active material layers formed on the positive current collector. The negative current collector and the positive current collector can have negative electrode tabs 2010 and positive electrode tabs 2020 formed thereon by soldering. The negative electrode tabs 2010 can be connected to the second casing 50 by soldering. The positive electrode tabs 2020 can be connected to the first terminal plate 12 of the terminal post 10 by soldering. Thus, the terminal post 10 and the second casing 50 can have opposite polarities. When the first casing 20 is made of metal, the negative electrode tabs 2010 can also be connected to the first casing 20.

In at least one embodiment, the battery 1 further includes at least one first protection member 300 received in the battery casing assembly 100. Each first protection member 300 is positioned at an end portion of the battery cell 200. In at least one embodiment, two first protection members 300 are included. One of the first protection members 300 is positioned between the top end portion of the battery cell 200 and the first casing 20, and isolates the battery cell 200 from the first casing 20. Thereby, the terminal post 10 is prevented from piercing the electrode plates of the battery cell 200. When the outermost electrode plate of the battery cell 200 at the top end portion is the negative electrode plate 201, the first protection member 300 also isolates the positive electrode tabs 2020 from the negative electrode plate 201. The other one of the first protection members 300 is positioned between the bottom end portion of the battery cell 200 and the bottom wall of the second casing 50, and isolates the battery cell 200 from the bottom wall of the second casing 50. Each first protection member 300 can be a flat plate.

The battery 1 further includes a second protection member 400 received in the battery casing assembly 100. The second protection member 400 surrounds periphery of the battery cell 200. The second protection member 400 isolates the battery cell 200 from the sidewall of the second casing 50. To surround the periphery of the battery cell 200, the second protection member 400 can be annular.

Since the first casing portion of the first casing protrudes from the second casing portion and the terminal post is partially received in the receiving space, there is no waste of the internal space in the second casing portion because of the terminal post. Then, the energy density of the battery is improved. Furthermore, a distance between the terminal post and the battery cell received in the battery cell assembly is increased, which makes the terminal post 10 less likely to pierce the electrode plates of the battery cell during the crush test. Thus, a short circuit can be avoided, and the battery quality and customer satisfaction are improved. Moreover, the first casing portion, which is protruding from the second casing portion, improves the structural strength of the battery cell assembly. Collapse and swelling of the battery cell assembly are avoided.

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A battery comprising:
a battery cell; and
a battery casing assembly for receiving the battery cell;
wherein the battery casing assembly comprises:
a first casing plate made of a conductive material; and
a terminal post for electrically connecting to the battery cell;
wherein
the first casing plate comprises a first casing portion and a second casing portion, the first casing portion protrudes from the second casing portion by a distance H to form a receiving space;
the terminal post is fixed to the first casing portion through an opening of the first casing portion;
the terminal post comprises a first terminal plate and a second terminal plate, the second terminal plate is positioned outside of the receiving space, and the first terminal plate is positioned inside of the receiving space; and
a bottom surface of the first terminal plate is spaced apart from a plane defined by an inner surface of the second casing portion by a distance h, the bottom surface of the first terminal plate being the surface of the first terminal plate facing the battery cell, and the inner surface of the second casing portion being the surface of the second casing portion facing the battery cell; and $0<h<H$.

2. The battery of claim 1, wherein the terminal post further comprises a post body between the first terminal plate and the second terminal plate, and the post body is fixed in the opening.

3. The battery of claim 2, wherein
a width of the post body is less than a width of the first terminal plate and a width of the second terminal plate, thereby forming a receiving slot at a periphery of the terminal post; and
the first casing portion is fixed in the receiving slot.

4. The battery of claim 3, wherein
the first casing portion comprises a sidewall and a top wall;
the opening is defined in the top wall;
the sidewall is positioned between the second casing portion and the top wall, and connected to the second casing portion; and
the top wall is parallel to the second casing portion, and is fixed in the receiving slot.

5. The battery of claim 4, wherein
the battery casing assembly further comprises a first insulation plate and a second insulation plate fixed in the receiving slot;
the first insulation plate comprises a first insulation portion and a second insulation portion connected to the first insulation portion;
the first insulation portion is positioned between the post body and the top wall;
the second insulation portion is positioned between the first terminal plate and the top wall; and
the second insulation plate is positioned between the second terminal plate and the top wall.

6. The battery of claim 1, wherein
the battery casing assembly further comprises a second casing; and
the first casing is connected to the second casing through the second casing portion.

7. The battery of claim 6, wherein
the first casing and the second casing are connected by soldering;
the battery cell comprises a positive electrode plate, a negative electrode plate, and an isolation film positioned between the positive electrode plate and the negative electrode plate;
the positive electrode plate is electrically connected to the terminal post; and
the negative electrode plate is electrically connected to the first casing or the second casing.

8. The battery of claim 1, further comprising at least one first protection member received in the battery casing assembly, wherein each of the at least one first protection member is positioned at an end portion of the battery cell.

9. The battery of claim 8, further comprising a second protection member received in the battery casing assembly, wherein the second protection member surrounds a periphery of the battery cell.

* * * * *